United States Patent [19]
Shechet et al.

[11] Patent Number: 5,394,731
[45] Date of Patent: Mar. 7, 1995

[54] WHEEL-MOUNTED VEHICLE SHOCK ABSORBER TESTER

[76] Inventors: Morris L. Shechet, 4171 Andros Way, Oceanside, Calif. 92056; Allan N. Shechet, 2239 Linnington Ave., Los Angeles, Calif. 90064-2339

[21] Appl. No.: 89,090

[22] Filed: Jul. 8, 1993

[51] Int. Cl.$^6$ ............................................. G01M 17/04
[52] U.S. Cl. .................... 73/11.07; 73/11.04; 73/12.01
[58] Field of Search ............... 73/11.07, 11.04, 11.08, 73/12.01

[56] References Cited

U.S. PATENT DOCUMENTS

| | | | |
|---|---|---|---|
| 1,891,613 | 12/1932 | Widney | 73/11.07 X |
| 3,792,604 | 2/1974 | Fader et al. | 73/11.07 |
| 4,376,387 | 3/1983 | Stevens et al. | 73/11.07 |

Primary Examiner—Richard E. Chilcot, Jr.
Assistant Examiner—Joseph L. Felber

[57] ABSTRACT

This invention is an improved low cost method for in situ quantitative testing of damping characteristics of vehicle suspension systems, the primary element of which is the shock absorber. The method includes [the following five steps]: [1.)] extending the suspension system [a predetermined amount] at one or two wheels by raising the vehicle body; [2.)] dropping the vehicle body in an unimpeded manner; [3.)] measuring and [4.)] recording the [car] vehicle body motion with respect to the top of the wheel(s); and [5.)] comparing and evaluating the measured performance against [the performance] that of the vehicle suspension system when it was operating properly. [An example of a car] A vehicle raiser/dropper is included comprising a scissors jack modified with a positive release split nut release mechanism. The vehicle body motion with respect to the top of the wheel is measured and recorded on a wheel mounted assembly which is coupled to the vehicle body by a motion coupling arm which in turn is attached to the body by a magnet or suction cup. [arrangement.] Two recording methods are described; [1.)] a wheel-mounted constant speed turntable with a unique pencil mounting which is coupled to the vehicle body by the motion coupling arm; and [2.)] a wheel-mounted angle sensor which produces an electrical signal which is then recorded on an external [prior art] recorder or computerized [electronic test] equipment. Comparison and evaluation of the recorded vehicle motion with respect to the top of the wheel is done by overlaying the same type of recorded information made by the equivalent equipment when the vehicle suspension system was operating properly [thereby] permitting detailed evaluation of the differences.

9 Claims, 8 Drawing Sheets

WHEEL-MOUNTED VEHICLE SHOCK ABSORBER TESTER

BACKGROUND

1. Field of Invention

This invention relates to in situ testing of vehicle suspension damping components such as automobile shock absorbers and McPherson struts.

2. Description of Prior Art

Modern automobiles generally have excellent handling characteristics when they are new. (Note that the terms automobile, car and vehicle are used interchangeably in this specification.) These characteristics have been designed into the car with a great deal of effort by the automotive engineers, taking into consideration the masses of the car, the spring and tire resiliences, and the damping factors of the shock absorbers, also called shocks and struts, and other dynamic and linkage elements of the suspension system. One of the most frequently encountered handling problems experienced by car owners as the new car is driven and becomes worn or abused, is caused by shock absorber or MacPherson strut deterioration. Deterioration of these motion damping elements destroys the handling characteristics of a car, however repair of problems cause by faulty shock absorbers is simple to perform by replacement once the problem has been identified. But therein lies the problem.

The most common method for checking the performance of shock absorbers is for the owner or mechanic to jump up and down on the car bumper and observe whether or not the car motion appears to be adequately damped. When the shocks are completely worn out, it is clear that the damping is inadequate, however by the time the wear is readily observable, the car owner has been driving for an extended period of time with bad shocks. By then the owner has learned to hate his vehicle, the tires have been abnormally worn, and the roadability has deteriorated to the point that he or she has been driving dangerously all over the road.

Conscientious and honest mechanics will 'test' the shocks individually by disconnecting one end and manually pulling and pushing to judgmentally observe the level of damping resistance. Disconnecting the shock can be an expensive proposition on many cars. These methods of jumping on the bumpers and of pulling and pushing on disconnected shocks are highly subjective and unreliable except for the cases where the shocks are completely worn out. Frequently mechanics will point out the shiney spots where suspension elements may have 'bottomed out' and indicate that new shocks are needed, usually leaving the customer wondering whether he is getting a correct diagnosis. Leaky hydraulic shocks are more easily identified in that the leaks usually can be identified by observation.

Despite the fact that this problem has been in existence since the advent of the automobile, an economic, technically valid method is not available today for the ordinary garage mechanic to determine whether the shocks on a car have degraded to the level that replacement is necessary or advisable except for the completely inoperative shocks.

U.S. Pat. No. 1,891,613, 'Method of and Apparatus for Testing the Riding Qualities of Vehicles Issued Dec. 20, 1932 is the prior art which is most pertinent to our invention. Our invention differs from that invention in five specific areas:

1. Our invention incorporates an improved, inexpensive car raiser and dropper method;

2. Our invention specifically measures the motion of the vehicle body with respect to the wheel, which is also where the shock absorbers are mounted.

3. Our invention incorporates an inexpensive wheel-mounted car body motion sensor and recording method with enough sensitivity to detect and display minor and major shock degradation including sometimes subtle differences between front and rear shock performance.

4. Our invention provides an alternate improved wheel mounted method for motion sensing for use with an external prior art readout recorder or other visual display or for use in conjunction with a computer or special test equipment.

5. Our invention incorporates a continuously updated library of baseline performance curves for different vehicles (including old and new vehicles, front and rear), said library being available as transparent overlays, or in a computer data base amenable for electronic display or paper printout.

Primary emphasis for this invention is placed upon providing functional simplicity coupled with effective performance measurement in an economical manner. The approach includes other options which may be preferable from the view point of operational ease and time saving although more expensive.

Other prior art patents related to shock absorber testing which were reviewed include:
U.S. Pat. No. 2,716,883 Testing Machine for Shock Absorber or the Like, Sep. 6, 1955
U.S. Pat. No. 2,934,940 Means for Testing Shock Absorbers, May 3, 1960
U.S. Pat. No. 2,923,147 Shock Absorber Tester, Feb. 2, 1960
U.S. Pat. No. 4,376,387 Dynamic Shock Absorber Evaluation, Mar. 15, 1983.

OBJECTS AND ADVANTAGES OF THE IMPROVED SHOCK TESTER

Objects and advantages of the present invention are:

a. to provide an effective method of shock absorber testing in situ without requiring disassembly of any automobile parts;

b. to provide a method for shock absorber testing which provides the minimum amount of quantitative information to permit effective shock performance evaluation;

c. to provide a shock absorber tester which is affordable by ordinary service station repair shops;

d. to provide a shock absorber tester which is understandable, operable and maintainable by garage personnel;

e. to provide a shock absorber tester with a visual output record which is readily understood and evaluated by the tester and by automobile owners;

f. to provide a shock absorber tester approach which can be enhanced and elaborated upon for specialized service facilities employing special automated equipment for greater convenience and appeal to the more sophisticated and affluent customer.

REFERENCE NUMERALS ON DRAWINGS 2 standard scissors jack assembly
6 threaded split nut
8 threaded screw
10 split nut opener wedge
12 split nut assembly
14 split nut retainer assembly
16 smooth sleeve scissors hinge assembly
17 smooth clearance hole
18 fixed scissors hinge
19 smooth sleeve scissors hinge mounting bolt hole
20 split nut retainer pull cables
21 handle of split nut retainer pull cables
22 split nut and retainer guide pins
23 guide pin clearance holes
24 jack crank tine
26 car lift pad
31 guide pin retainer plate
32 wedge bar
33 wedge engagement gap
36 wedge bar retainer pin
38 vehicle body
40 motion coupling arm
42 fulcrum
44 wheel mounted base
46 turntable drive motor
48 tire
50 threaded rod base support
52 turntable
53 turntable hub and paper retainer
54 pencil assembly
55 dogleg hinge
56 magnet assembly
57 preprinted paper
58 starting track
60 ending track
61 typical vehicle body motion trace
62 fixed part of magnet assembly
64 rotating part of magnet assembly
66 slip-fit hole for motion coupling arm
68 finish protection film
69 line plug
70 angle sensing device
72 excitation/signal lead to separate recorder
73 recorder
74 fulcrum set screw
76 ¼-20 nut/pencil holder
78 glue line
80 pencil
86 time markers
88 overlay board base
90 overlay board spindle

SUMMARY OF INVENTION

Figure 1:
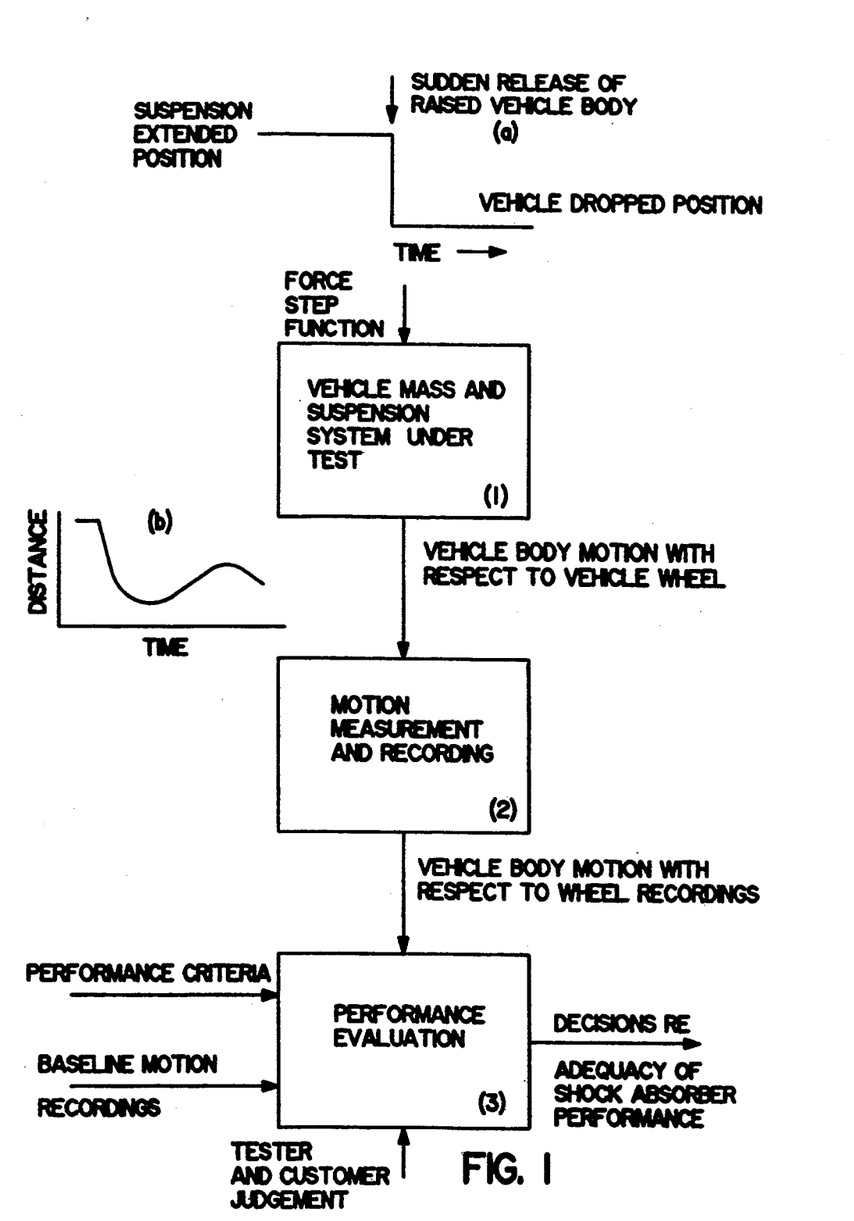
FIG. 1 "The Shock Tester Method" shows the total method of the shock tester approach indicating the several functional elements.

The method of the shock tester is shown in the annotated block diagram in FIG. 1. The method of testing includes providing an excitation to the vehicle suspension system and recording the resulting motion of the car body with respect to the wheels of the car; and then evaluating that motion by graphical comparison of the recording with a previously made recording of the car body motion when the suspension system was operating as new. Differences revealed by the comparison will allow an accurate assessment of the performance of the shock absorbers. The term 'motion of the car body with respect to the wheels' refers to position as a function of time for the discussions in this specification, however the velocity or acceleration of the car body with respect to the wheel or with respect to the earth may also be useable. In most cases, however, those parameters are more expensive to measure and interpret. Measurements with respect to the earth, will also include the effects of other parameters, such as tires, which will partially mask the effects of the shock absorbers which directly damp the motion between the wheels and the vehicle body.

Suspension system excitation

The excitation is accomplished by extending the suspension system of the car at one of the wheels by raising the body while leaving the wheel lightly in contact with the ground or floor, or slightly raised and then suddenly permitting the car body to fall freely back onto the suspension elements. Currently, excitation for shock testing is done by jumping up and down on the bumper of the car, a practice that cannot be controlled and calibrated quantitatively.

The prior art invention U.S. Pat. No. 1,891,613 used a collapsing jack to perform this function, and our invention performs this function also with a collapsing jack. However, our improvement to that part of the invention includes use of an ordinary scissors jack with a split nut modification to permit the car body to fall freely without any obstruction or hindrance. The purpose of the collapsing jack is to provide the sudden application of gravitational force (a) illustrated at the top of FIG. 1. The car body is jacked up a predetermined distance extending the automobile suspension, and then it is permitted to suddenly fall. Hydraulic or pneumatic jacks modified for quick release can also be used for this function.

Auto Body Motion

When the collapsing jack permits the car body to suddenly drop, the vertical position of the car body will vary as a function of time in the manner typified by the distance vs time curve shown on FIG. 1 just below the block labeled (1) and to the left of the words 'Auto body motion'. This type of damped modified sinusoid curve is characteristic of the response of a spring-mass-damper assembly such as the automotive suspension system. The shock absorber is the principal contributor to the rapidity with which the resulting modified sinusoidal motion is damped. The distance vs time curve shown in FIG. 1 is typical of a well damped response indicating properly operating shocks. Worn shocks would produce a curve with more overshoots and undershoots of the rest position, i.e.: the car dropped position, and would require more time to finish the oscillations.

There is an extensive body of mathematical analysis which is possible with respect to the design parameters and the actual performance of the automotive suspension system, however that analysis is not pertinent to the approach being taken in this invention since the evaluation of the performance of the shock absorbers will be by graphical comparison of the measured and recorded car body position versus time curve with the original car body position versus time curve of the car when performing as new.

Motion Measurement and Recording

The block (2) of FIG. 1, represents the auto body motion measurement and recording function. It operates upon the auto body vertical motion and converts it into a measurable and visible curve similar to the distance vs time curve illustrated just above this block.

The primary prior art patent referenced above, performs this function by fastening a pencil to the body of the car, and as the car is dropped and oscillates therefrom, a paper is caused to move across the pencil producing a trace indicating the vertical movement of the car body as a function of time. Our invention performs these functions using a simple wheel mounted assembly.

Our invention has two different configurations for performing these functions; a. Wheel-mounted Car Motion Detector and recorder; and b. Wheel-mounted Car Motion Detector for use with separate prior art recorders or separate test equipments or separate computers.

Configuration a. Wheel-mounted Vehicle Body Motion Detector and Recorder. See FIG. 3

Figure 3:
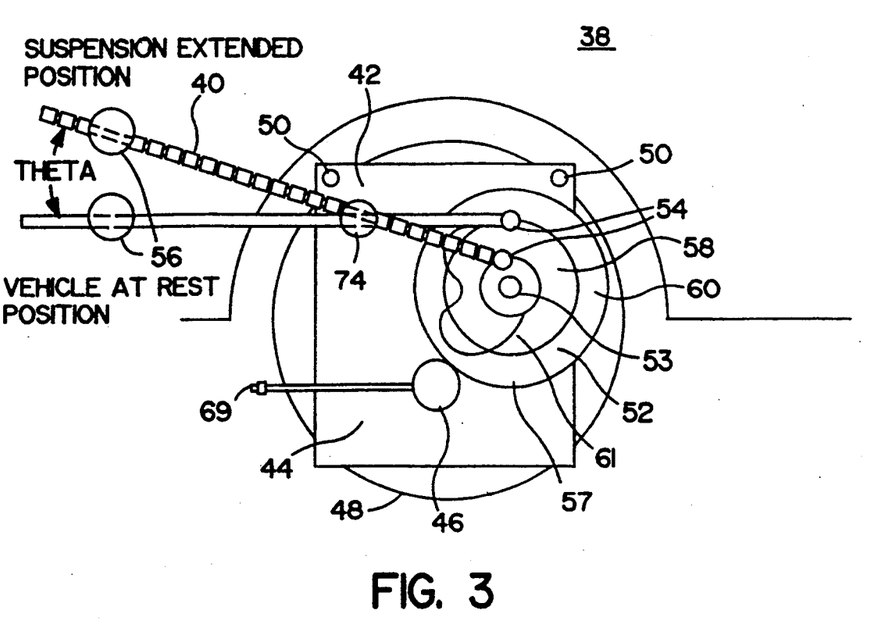
FIG. 3 "Wheel-Mounted Vehicle Body Motion Sensor and Recorder" shows the assembly for producing a record of the transient response of the car body with respect to the wheel when dropped from a predetermined distance.
Figure 3A:
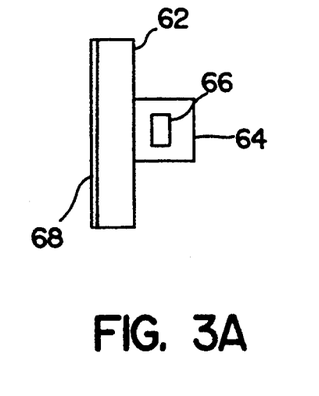

In this configuration, a wheel-mounted base 44 is placed on the tire of the wheel being tested. The base is held in place by two threaded rod supports 50. Mounted on the base is a turntable 52 similar to a phonograph turntable which is driven by a synchronous motor powered from a 60 Hz (in the U.S.) power line plug 69. The turntable rotates at a constant speed when energized. On the turntable is mounted a circular preprinted paper 57 with timing and amplitude markings, (see FIG. 6), upon which the motion of the car body is written with a pencil 80 or other marking instrument (see FIG. 4).

The car body motion is coupled to the turntable paper by use of a motion coupling arm 40. At the turntable end of the motion coupling arm, a pencil assembly 54 is mounted. Near the other end of the arm, the arm passes through a slip fit hole 66 on a rotating part of magnet assembly 64 which is magnetically attached to the car body 38. (This attachment may also be achieved using a suction cup especially for those car bodies which are made of non-magnetic materials.) Between the magnet and the pencil and on the wheel-mounted base is located a fulcrum 42 which couples the angular motion produced by the vertical motion of the car body to the angular motion which results in the proportional curvilinear nominally vertical motion of the pencil assembly 54. The fulcrum may have more than one position to accommodate major differences in suspension travel among some vehicles.

When the car suspension is extended, the pencil is in a position closest to the turntable hub and paper retainer 53. When the vehicle body 38 is dropped, the pencil 80 traces, as a function of time, a transient response more or less similar to that shown in the distance vs time curve of FIG. 1 and ends at the normal rest position of the car, marking the circle of the ending track 60 near the periphery of the circular paper on the turntable 52. The transient curve on the circular paper corresponds approximately to the rectilinear coordinates curve shown in FIG. 1.

Configuration b. Alternate Wheel-Mounted Vehicle Body Motion Sensor for use with Separate Recorder (See FIG. 5.)

In this configuration, a base is mounted on the vehicle wheel in a manner similar to Configuration a. A motion coupling arm 40 converts the vertical motion of the car body to an angular motion by virtue of the fixed connection at the other end of the arm to an angle sensing device 70 mounted on the wheel-mounted base. The angle sensing device may be a potentiometer or an optical or other type of angle sensor producing an electrical output 72 either analog or digital. For simplicity and low cost, a potentiometer energized by a small battery is considered as the angle sensing device in FIG. 4 producing an analog electrical signal. The signal from the potentiometer drives an external prior art strip chart or x-y recorder (not shown) or other recording arrangement producing a curve of car body position vs time which is similar to that shown in FIG. 1. The said signal may also be applied to a computer were it may be digitized and compared with baseline data stored therein. The said signal may also be applied to available automotive test equipment.

Performance Evaluation

The records of car body motion with respect to the wheel output of block (2) of FIG. 1 represent the performance of the car suspension elements being tested. In addition to those records of motion, Block (3) of FIG. 1 Performance Evaluation requires as inputs, the criteria for evaluation of performance and the judgment of the tester and the customer. The output of this function is the decision of the customer with respect to the adequacy of the performance in the context of the need for replacement of the shocks or possibly other suspension elements. With continued use of this invention in the field, eventually, automotive technicians will recognize symptoms of other suspension problems. A primary criterion for evaluation will be the length of time it takes for the car body motion to settle to its new position after being dropped; for example to within 5% of its final rest postion.

DETAILED DESCRIPTION OF INVENTION—FIGS. 1 TO 6

FIG. 1. The Shock Tester Method

The Shock Tester Method illustrated in FIG. 1 is based upon a systematic approach driven by 1. the desired ultimate result of permitting decisions to be made relative to the quality of the items under test (the shock absorbers) and by 2. what information is required to make that decision. Two other systematic requirements for this invention, are 1. that the cost of the equipment for performing the shock testing be low enough so that most automobile service shops will be able to afford it, and 2. that the complexity of the equipment and information is low enough to permit personnel with comparatively low levels of formal education to be able to use the equipment and interpret the results.

Overall description

The overall approach requires that the car body be raised at one of the wheels, thereby extending that part of the suspension system including the shock absorber, and then permitting the car body to drop freely under the influence of the force of gravity. This results in a theoretical step function of force, the waveform of which is shown (a) at the top of FIG. 1.

The mass of the car body and the elements of the suspension system, Block (1), are acted upon by the force of gravity to produce the typical damped more or less sinusoidal waveform of position versus time shown as (b).

Block (2) acts upon the time varying position of the car body with respect to the wheel to produce a visible, non-volatile image representing that motion. This imagery is represented as the 'motion recordings' shown at the bottom of block (2).

Block (3) represents the performance evaluation function which operates upon the car body motion recordings from block (2), using a set of criteria and car body motion baseline records, shown as inputs at the left of this block. The test operator and the automobile owner review the imagery in the context of the criteria shown at the left of block (3) to make decisions with respect to the adequacy of performance of the shock absorbers. Among the performance criteria will be the number and amplitude of over and undershoots of the car body position with respect to the car dropped rest position, and the time it takes for the car body to arrive within a predetermined proximity to the rest position. The output of the system, the desired decisions, is shown to the right of block (3).

Position step function

Waveform (a) at the top of FIG. 1 represents the theoretical position step function which is applied to the car body with its suspension extended. This waveform starts at a high level which drops vertically to a lower level. The upper level on the left of the waveform represents the position of the car body with the suspension extended, and the lower level represents the rest position of the car body after it is dropped. The corner at the upper line representing car position, represents the time at which the car body is released to drop as a result of the sudden application of gravitational force.

Three approaches to the car raiser/dropper function are included as parts of this invention.

Approach 1 extends the car suspension, and permits the car body to fall freely. A scissors jack modified with a quick release split nut arrangement is a low cost embodiment of this approach.

Approach 2, a more expensive approach to this function utilizes a regular pneumatic or hydraulic floor jack which has been modified to permit the car body to fall freely.

Approach 3 is a much more expensive approach, however one which has the potential for being much more rapid to use, wherein a section of a service shop can be dedicated to the testing of shock absorbers with in-floor car body raising and dropping platforms for use with two or four parallel channels of sensors and recordings.

Automobile suspension system under test

Block (1) of FIG. 1 represents the automobile elements under test, comprising the mass of the car, the springs, tires, the shock absorbers, and other suspension elements and associated couplings and bushings. When the automobile is new, all these elements are (usually) in good working order, and the motion resulting from the excitation of the car raiser/dropper mechanism will produce a waveform more or less typified by the well damped sinusoldlike waveform sketch (b). The primary element of the suspension system influencing its damping performance is the shock absorber, however, it is anticipated that after extensive use of this invention, diagnosis of problems with other suspension elements will also be possible.

As the shock absorbers degrade, the damping of the oscillatory motion depicted in the sketch (b) will be reduced and more and longer oscillations will be evident.

Motion measurement and recording

Block (2) of FIG. 1 includes two functions, 1. the sensing and measurement of the car body motion with respect to the wheels, and 2. the conversion of that information to a visible non-volatile display suitable for comparison with baseline performance data.

Two embodiments are included for this function: a. a wheel mounted arrangement that combines the motion sensing and the recording in one assembly, and b. a wheel mounted arrangement for sensing the car body motion for recording on a separate prior art recorder or for inputting to a separate computer or test equipment.

The outputs of block (2) of FIG. 1 are the records of the car body motion with respect to the wheels of the vehicle being tested.

Performance evaluation

Figure 7:
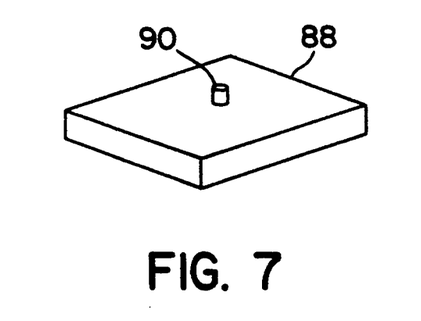
FIG. 7 "Overlay Board" for comparison of vehicle motion recordings.

Block (3) of FIG. 1 represents the final function of the systematic approach to shock testing, resulting in the decisions with respect to the adequacy or inadequacy of the shocks under test. The suspension system performance evaluation is done by the tester and the customer. The evaluation compares the motion recordings of the car under test with the baseline motion recordings which are similar curves made with similar or equivalent equipment, representing the performance of the car suspension system when it was new. Typically the comparisons will be done with the use of a light box permitting viewing of both images simultaneously. The images are placed on overlay board base 88, centered by overlay board spindle 90. See FIG. 7. Initial criteria for establishing the thresholds for replacement of shocks will be arbitrary, however as data becomes available from use of this invention coupled with driver comments, more definitive criteria will be derived. These definitive criteria will be based upon driver preferences with respect to ride quality, handling, and safety. Before now, such information has not been available for development of such detailed criteria.

The definitive performance data which will become available with this invention in use, will also eventually permit diagnoses of some suspension problems other than those related to shock absorbers.

Figure 2:
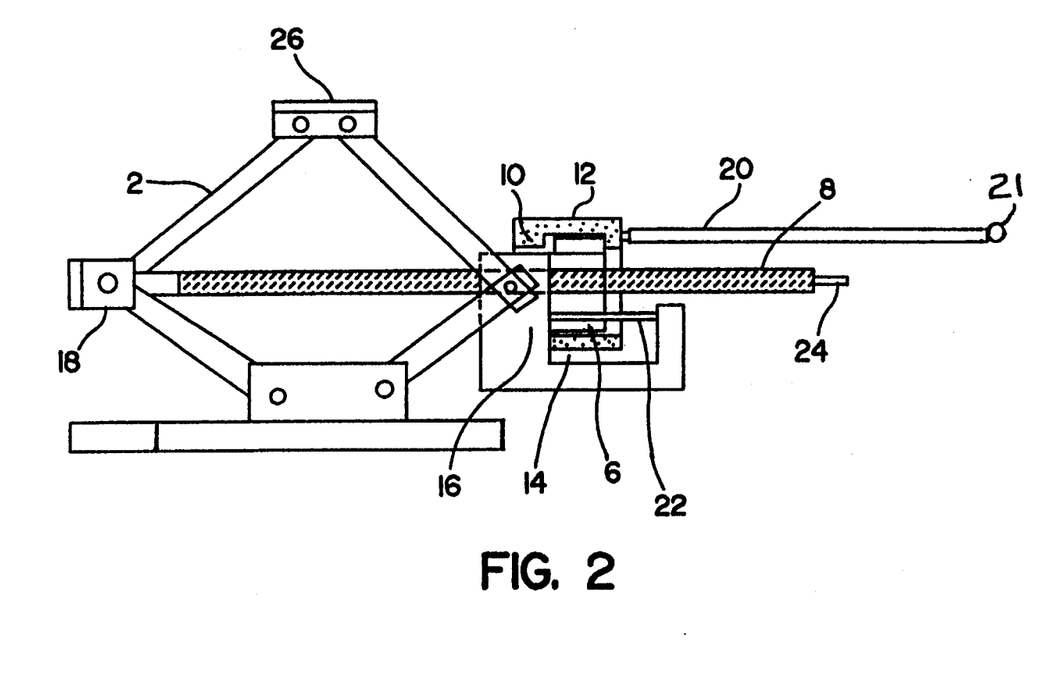
FIG. 2 "Car Raiser/Dropper Assembly" shows a method for producing the suspension system excitation input.
Figure 2A:
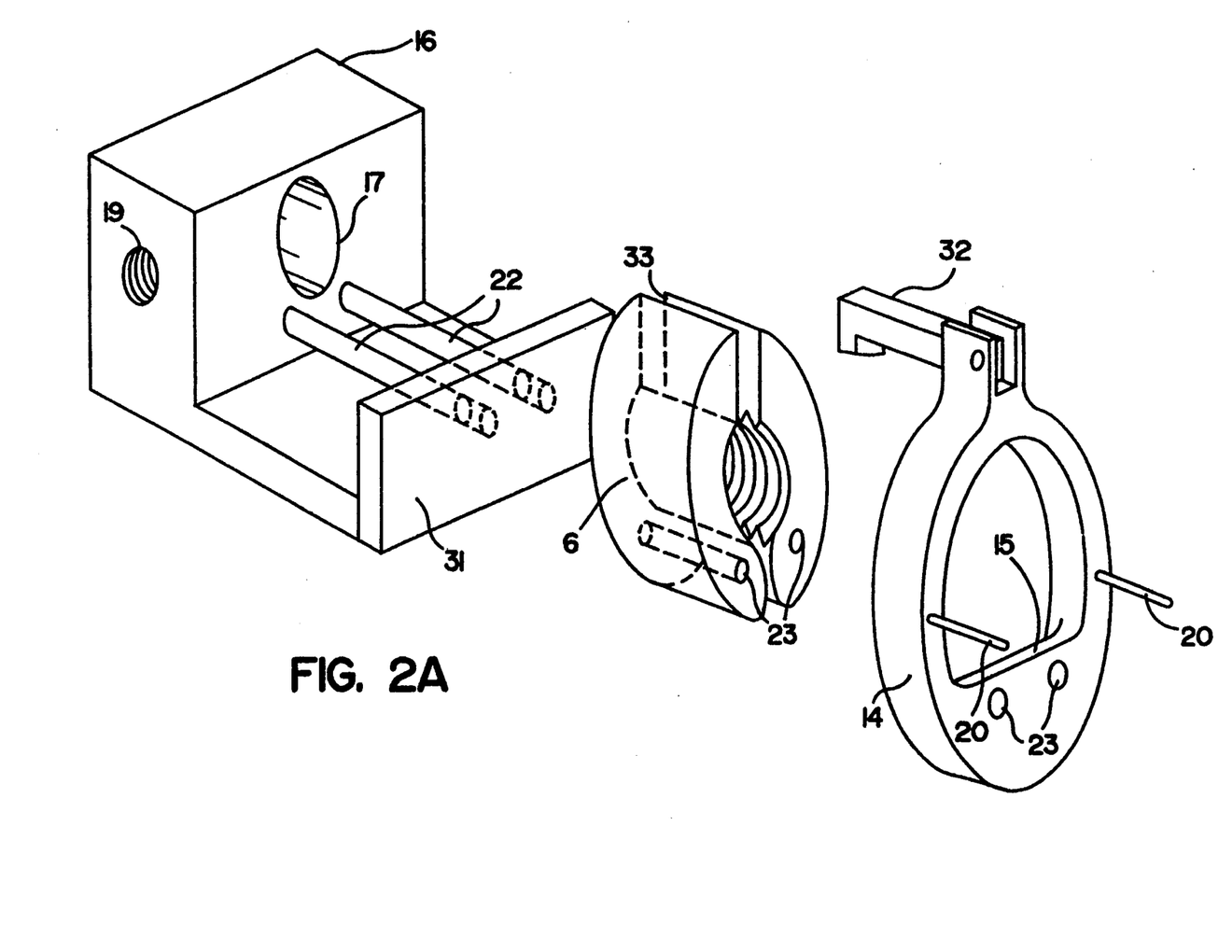
FIG. 2A "Split Nut Assembly" illustrates the details of the key element for the car dropper function of the Car Raiser/Dropper Assembly.
Figure 2B:
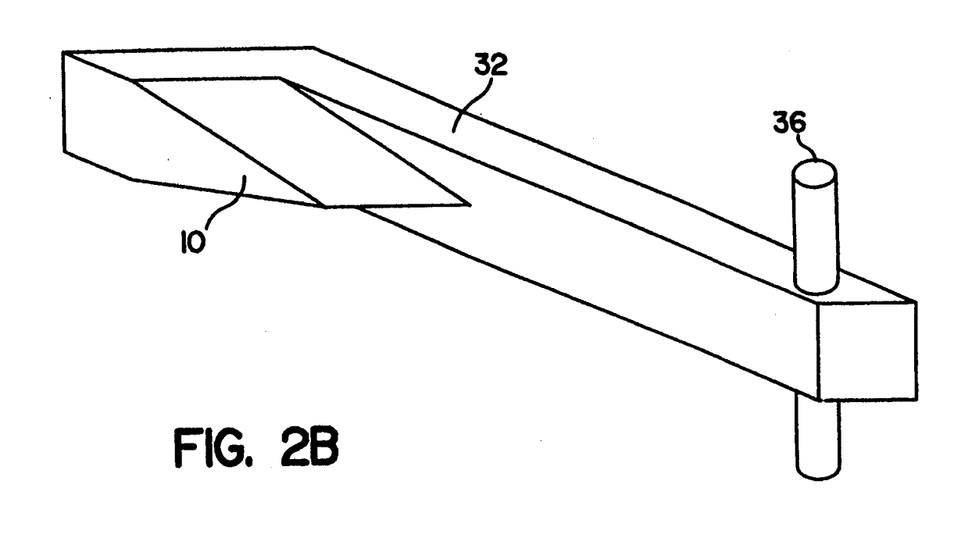
FIG. 2B "Wedge Bar Detail" illustrates the element which assures opening of the split nut.

FIG. 2 Car Raiser/Dropper Assembly FIGS. 2A and 2B

A standard scissors jack is modified for use as the car raiser and car dropper. The travelling threaded nut on the jack screw portion of the scissors jack is removed and replaced by a split nut assembly 12. With the split nut in the closed (retained) position, the normal car raising function is in effect; when the split nut is opened the car body is permitted to drop without hindrance.

Car raiser function

Operation of the standard scissors jack assembly 2 in its normal mode is the method used for raising the car. The unmodified scissors jack normally has a simple threaded nut assembly located where in FIG. 2 the smooth sleeve scissors hinge assembly 16 is shown. In the modified scissors jack assembly of this invention, the threaded nut is replaced by a split nut assembly 12. When the split nut is not split, i.e., when it is retained in a closed nut configuration, the raising function is exactly the same as with the unmodified scissors jack threaded nut. With a jack crank (not shown) coupled to the jack crank tine 24 of the threaded screw 8, the threaded screw 8 is caused to rotate so that the closed split nut is caused to translate to the left of the figure. Since the other end of the threaded screw 8, although permitted to rotate, is retained longitudinally at the fixed scissors hinge 18, the two scissors hinges are caused to move towards each other and in so doing, cause the car lift pad 26 to rise with sufficient mechanical advantage and structural strength to raise the car. Another scissors jack configuration can be used in which the fixed scissors hinge 18 may be caused to translate towards the other hinge by incorporating a section of the jackscrew and nut with a thread of the opposite sense from the thread on the other end. This approach will result in a more rapid car raising, however the method is identical to that which is described.

The point on the automobile under which the car lift pad 26 is placed is selected with care and will usually correspond to the normal jacking point designated by the car manufacturer. In some special cases, it may be necessary to use an adaptor on the car lift pad 26 to accommodate special jacking configurations.

Car dropper function

For this discussion, refer to FIG. 2A Split Nut Assembly 12 and to FIG. 2B Wedge Bar Detail in addition to FIG. 2 Car Raiser/Dropper Assembly, and to FIG. 3, Wheel-mounted Vehicle Body Motion Sensor and Recorder.

Operation

The principal element of the car dropper function is the split nut assembly 12. The three major parts of the split nut assembly 12 are, the smooth sleeve scissors hinge assembly 16 the threaded split nut 6 and the split nut retainer assembly 14. FIG. 2A shows these three parts in exploded view. Normally the threaded split nut 6 and the split nut retainer assembly 14 are assembled so that the split nut and retainer guide pins are engaged in the guide pin clearance holes 23 of the split nut 6 and the split nut retainer assembly. As shown in FIG. 2, these elements are mounted to the left of the guidepin retainer plate 31 so that there is a clearance space between the split nut retainer assembly 14 and the guidepin retainer plate 31. When the split nut 6 is opened to permit the car body 38 to free fall the split nut retainer assembly is pulled back into that clearance space using the split nut retainer pull cables 20. The split nut opener wedge 10 on the wedge bar 32 provides a positive splitting action to open the split nut.

Smooth sleeve scissors hinge assembly 16

The smooth sleeve scissors hinge assembly 16 is designed to fit between the parallel arms of the scissors jack replacing the normal threaded nut. The smooth sleeve scissors hinge assembly 16 is mounted in that position using the mounting bolt holes 19. The smooth sleeve terminology refers to hole 17 which is a clearance hole for the threaded screw 8 to slide through when the threaded split nut is opened. This hole also serves to retain the entire smooth sleeve scissors hinge assembly 16 in its nominally horizontal position through the interaction of the threaded screw 8 with the smooth walls of the smooth clearance hole 17. The edges of hole 17 are rounded to reduce any risk of catching on the threads of threaded screw 8 as it slides through.

The split nut and retainer guide pins 22 are mounted below the clearance hole 17 and supported at the other end of the assembly by the guide pin retainer plate 31. The pins are hardened and polished so that the threaded split nut 6 and the split nut retainer assembly 14 will slide easily over them.

Threaded split nut 6

The threaded split nut 6 is the equivalent of a heavy walled nut which is cut into two pieces and matched to the threaded screw 8. Each piece is mounted on the split nut and retainer guide pins 22 so that each piece has the freedom to disengage from the threads thereby releasing the threaded screw 8 and permitting the jack and the car body to free fall. The bottoms of both pieces of the threaded split nut 8 are rounded to eliminate interferences with each other when the nut splitting action is initiated. At the top of the threaded split nut 8, a small wedge engagement gap 33 is present to permit engagement by the split nut opener wedge 10. The split nut opener wedge 10 provides positive action to separate the two parts of the threaded split nut 6. The ease with which the two parts of the threaded split nut 6 opens is dependent upon the type of threads that are used for the threaded screw 8, for example, vee threads will have different separation force requirements than Acme or square threads.

Split nut retainer assembly 14

Operation of the threaded split nut 6 requires a means for holding the two parts together until it is desired to drop the car body. The design of the split nut retainer assembly 14 incorporates the wedge bar 32 which provides the positive opening action of the threaded split nut 6.

The inside diameter of the large hole in the split nut retainer assembly 14 is slightly larger that the diameter of the threaded split nut in the closed (threads engaged) position. When the split nut retainer assembly 14 is placed in its leftmost position as shown in FIG. 2, with the split nut retainer assembly 14 partially surrounding the threaded split nut 6, the nut is retained in its closed position so that the threaded screw 8 is fully engaged. The depth of the retaining hole in the split nut retainer assembly 14 is selected to be adequate for the retaining function while maintaining adequate material remaining to engage the split nut and retainer guide pins 22. In FIG. 2A, the remaining material for that purpose is shown as a partial web 15 for the sake of clarity and explanation.

With the split nut retainer 14 in position and performing its function, the wedge bar 32 is in a lowered position so that the point of the split nut opener wedge 10 is in position to engage the wedge engagement gap 33 of the threaded split nut 6. The wedge bar 32 is hinged to allow it to be raised to permit the assembly to slide over the threaded split nut 6 without interference. The wedge bar retainer pin 36 connects the wedge bar 32 to the split nut retainer assembly 14 in an articulated manner.

When the car body has been raised to the required position, and it is then desired to drop the car body, the operator grasps the handle 21 of the split nut retainer pull cables 20 and sharply pulls the split nut retainer assembly 14 to the right in FIG. 2. When the split nut retainer assembly 14 has moved to the extreme right of the clearance space between the threaded split nut 6 and the guidepin retainer plate, the edge of the retainer assembly 14 is clear of the edge of the threaded split nut 6 and the positive action of the split nut opener wedge 10 forces the threaded split nut 6 to open. When the threaded split nut 6 is opened, the entire split nut assembly 12 is released and permitted to slide to the right over the threaded screw 8, and the car body is dropped. While the split nut assembly 12 slides to the right, the threaded screw 8 is drawn to the left because of the movement of the fixed scissors hinge 18 in that direction.

Figure 4:
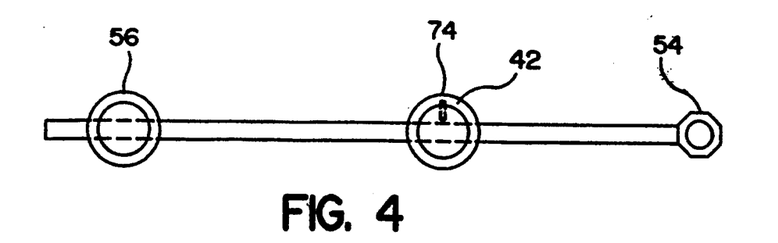
FIG. 4 "Motion Coupling Arm and Pencil Holder Assembly" of Wheel Mounted Vehicle Motion Detector and Recorder.
Figure 4A:
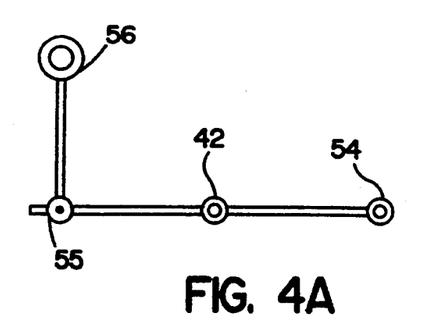
FIG. 4A "Dogleg Configuration of Motion Coupling Arm"
Figure 4B:
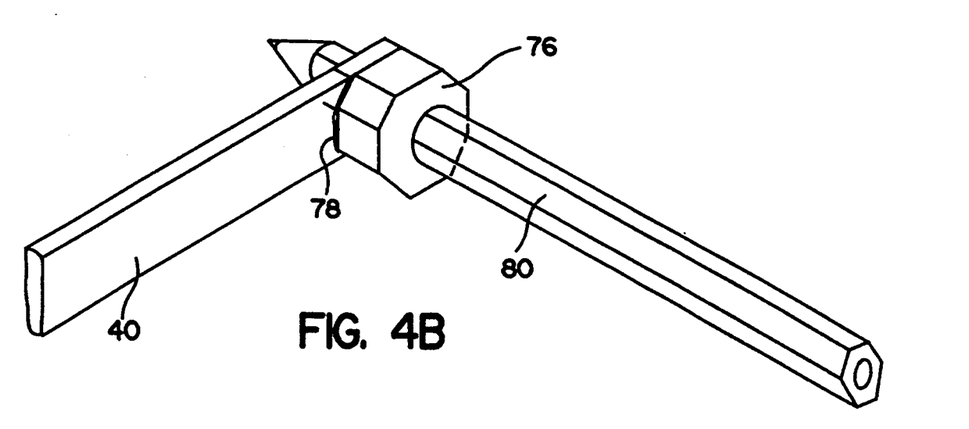
FIG. 4B "Detail of Pencil Assembly 54".
Figure 5:
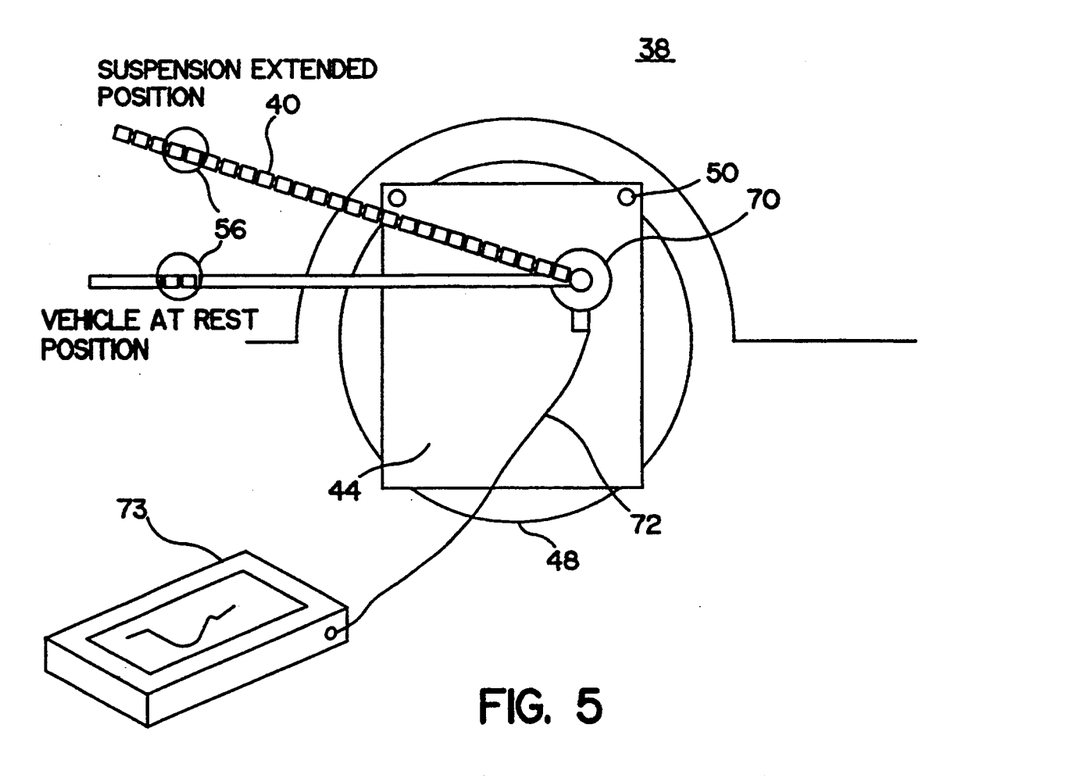
FIG. 5 "Alternate Wheel-Mounted Vehicle Body Motion Sensor for Use With Separate Recorder" illustrates a simplified arrangement for use with a more expensive external recorder.

FIG. 3 wheel mounted car motion sensor and recorder and FIG. 4 motion coupling arm and pencil holder and FIGS. 4A and 4B.

The wheel-mounted base 44 is suspended on the tire 48 of the wheel at the corner of the car to be tested by two threaded rod base supports 50. The threaded rods are preferred for mounting because they have a very high coefficient of friction providing a very firm mounted position on the tire and they are inexpensive stock items which are readily available. A turntable 52 is mounted on the wheel-mounted base 44. The turntable 52 also acts as a platen to receive a circular sheet of preprinted paper 57 upon which the car body motion information is recorded during the test. A turntable hub and paper retainer 53 holds the turntable onto its spindle and retains the paper against the surface of the turntable.

A turntable drive motor 46 is coupled mechanically to the turntable producing the required rotation. The turntable drive motor 46 is a synchronous motor such as a phonograph turntable motor which produces a constant speed rotation when it is energized from a constant frequency power source such as the 60 hertz power available from the normal power receptacles in the United States. Line plug 69 represents the connection with the normal power. A rotational speed of 10 revolutions per minute or 6 seconds per revolution is a convenient speed to use and it is easily obtainable by appropriate selection of ratios of diameters of the drive wheels during the detailed design process.

The vertical motion of the car body 38 is coupled to the pencil and preprinted paper 57 on the turntable 52 for recording by the motion coupling arm 40. In the normal rest position of the car, shown in FIG. 3 as the 'car dropped position', the motion coupling arm 40 is nominally in a horizontal position. A magnet assembly 56 fastens the left end of the motion coupling arm 40 to the car. (A suction cup is also an effective method for accomplishing this attachment, and a requirement for cars with fibreglass or other non-ferrous material body.) When the car body 38 is raised to extend the suspension of the car, the horizontal position of the motion coupling arm 40 is modified as shown by the dotted representation of the motion coupling arm 40 with the 'Suspension extended position' annotation. In this position, the pencil assembly 54 is moved from near the edge of the preprinted paper 57 to a point near the turntable hub and paper retainer 53. When the turntable 52 is energized, the pencil 80 traces a circular starting track 58. When the car is dropped and the magnet assembly moves from the 'suspension extended position' to the 'car dropped position', the resulting angular motion of the motion coupling arm 40 is coupled via the fulcrum 42 to produce near-vertical motion of the pencil 80. The vertical translation of the pencil assembly 54 interacting with the rotational motion of the preprinted paper 57 on the turntable 52 produces the typical car body motion trace 61.

The side view of magnetic assembly 56 of FIG. 3 illustrates that the slip-fit hole for the motion coupling arm 66 is rectangular in shape and that the other elements of this assembly include the magnet, fixed part of magnet assembly 62 as well as the rotating part of magnetic assembly 64. The finish protection film 68 is a thin element such as vinyl. This film is not needed if the attachment is made using a suction cup. The rectangular cross section of the motion coupling arm 40 is designed to provide rigidity in the plane of the turntable 52 for effective transmission of car body motion with respect to the wheel information while providing flexibility in the plane perpendicular to the turntable 52, thereby permitting minor misalignment between the surface of the car body 38 and the turntable 52. The fulcrum 42 has a similar rectangular hole to accommodate the motion coupling arm 40, and incorporates a set screw 74 to retain it firmly. The fulcrum 42 also has two parts, the upper one having the capability to rotate with respect to the lower one. When the magnet assembly 56 drops vertically, the motion coupling arm 40 rotates through the angle theta, the same angle appearing on both sides of the fulcrum 42. The motion coupling arm 40 is permitted to slide within the magnet assembly 56 to accommodate the fact that the attachment point on the car body 38 follows a vertical line and not an arc of constant radius with respect to the fulcrum 42. The portion of the motion coupling arm 40 to the right of the fulcrum 42 moves through the same angle, theta, as the portion of the arm to the left of the fulcrum. The pencil assembly 54 traces a constant radius arc in direct correspondence with the car body motion at the point of attachment of the magnet assembly 56. The fact that the car body motion trace 61 is produced by a constant radius arc rather than a linear motion is irrelevant, since the baseline motion recordings (see FIG. 1, block (3) input) will have the same characteristics.

The simple pencil holder assembly 54 comprises a ¼-20 nut attached at the glue line 78 at the right end of the motion coupling arm 40 over a clearance hole. Possibly, if the thickness of the motion coupling arm 40 is sufficient and of a material with adequate strength, a ¼-20 thread may be tapped directly into the material of the arm without the need for a nut. A common hexagonal cross section pencil 80 screws directly in a self threading manner into the ¼-20 thread. The pressure of the pencil upon the preprinted paper 57 is adjustable by screwing the pencil 80 through the nut towards the paper causing an increasing deformation in the plane perpendicular to the wheel of the motion coupling arm 40 and a corresponding increase in pencil pressure.

Another version of the combined car body motion sensor and recorder includes a vertical pushrod assembly for mounting the marking means, and an x-y rectangular coordinate recorder rather than the rotary turntable. The horizontal motion is produced by using a constant speed motor to drive the time axis and the car body motion coupled through the vertical pushrod produces the vertical axis motion.

The Alternate Wheel-Mounted Car Motion Sensor For Use With Separate Recorder 73 shown in FIG. 5 utilizes the same wheel mounted base 44 and the same motion coupling arm 40 and the same car raising and dropping elements. The car motion measurement method is also the same. The primary difference is in the removal of the fulcrum 42 and turntable 52, and the installation of a means for converting the angular motion of the motion coupling arm 40 into an analog or digital electrical signal. Electrical leads are connected to the angle sensing device to provide excitation as needed and to conduct the electrical signal representing the vehicle body motion to a separate recorder (not shown) of the appropriate type. An inexpensive and effective angle sensor is a simple potentiometer, the output of which is a voltage proportional to the excitation voltage and which varies in correspondence with the car body motion. Baseline car motion recordings for evaluation purposes are produced with similar or equivalent equipment. The resulting car motion curves generally will be in rectangular coordinates as shown in the Distance vs Time curve (b) of FIG. 1. The signal from the angle sensor is also available for inputting to a computer or test equipment if such equipment is already available in the automotive repair shop.

Figure 6:
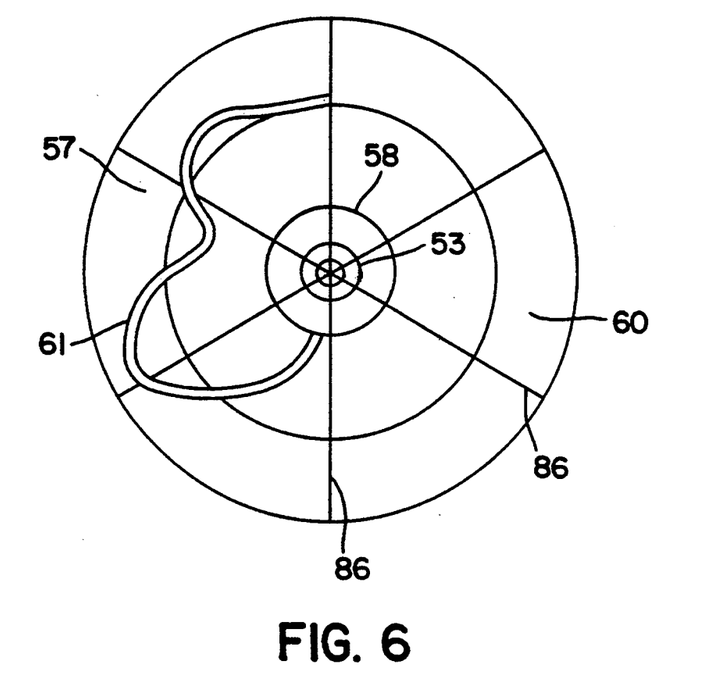
FIG. 6 "Typical Record of Vehicle Body Motion" illustrates the output of the Wheel Mounted Car Motion Detector and Recorder.

FIG. 6 illustrates a Typical Record of Car Body Motion for the rotary table embodiment of this invention. The outer circle of this figure represents the edge of the preprinted paper 57. The six radial lines represent the time markers 86 of one second each for a turntable rotating at ten revolutions per minute. Not shown, for clarity, are ten additional lines between each one second marker indicating tenths of seconds. These lines are printed lighter than the one second markers.

The second concentric circle from the edge of the paper, is the ending track 60. This track is at the location of the pencil when the car body is in its normal or car dropped position, that is before and after the test. Before the test, the magnet assembly 56 (or the suction cup assembly) position is adjusted by raising or lowering the car slightly so that the motion coupling arm 40 is nominally horizontal and the pencil 80 point lies upon the ending track circle 60. The operator raises the car until the pencil point lies upon the next concentric circle which is called the starting track 58. This circle is called 'starting track' because the transient curve, typical vehicle body motion trace 61, starts on this track and ends at the ending track 60, which also is the rest position before the car is raised. Among the criteria for determining the adequacy of performance of the shock absorber will be specific comparisons of the length of time it takes for the car body to arrive within a predetermined distance of the rest position after initiation of the car drop, and the number of cycles over and under the final rest position.

The central concentric circle of FIG. 6 represents the turntable hub and paper retainer 53.

SUMMARY, RAMIFICATIONS, AND SCOPE

Note that the method of this invention is clearly 'low tech' with the intent of providing very reliable, low cost, and easily operable equipment capable of providing adequate information for evaluating the condition of vehicular shock absorbers and potentially other suspension elements.

The method is also designed to provide information and confidence to the consumer who is able to see specifically the variations in performance of the suspension of his/her automobile in comparison with its performance when new. The consumer does not need to rely upon the word of a person who has a vested interest in selling another set of shock absorbers.

By the same means, the ability of the consumer to recognize deterioration of performance of the suspension system of the vehicle at an early stage, permits replacement of worn shocks before they are completely nonfunctioning. Establishments selling shock absorbers will be able to sell their products earlier and more often, thereby increasing their profits. Consumers will drive more safely and will derive greater enjoyment from their vehicles. Consumers will also derive greater longevity of their tires by reduced wear from faulty shocks. The environment will benefit by the overall extension of tire life and the associated implicit energy savings therefrom. The environment will also benefit from the positive effect on gasoline mileage of automobiles having effective shock absorbers versus bad ones. This last item derives from the implicit knowledge that a car riding smoothly on a road, as with good shocks, will use less energy than the same car at the same speed with bad shocks causing the car to oscillate up and down with road irregularities and with the concomitant excessive tire wear and heating.

This invention will make available a technically effective, and most important, an affordable method for determining the degree of degradation of shock absorber performance in a direct manner with the ability to compare it quantitatively with shock performance when new.

The wheel-mounted approach is lightweight and easy to handle and mount. By using plastic parts wherever possible, the manufacturing costs and weight will be kept low.

The reliability of the equipment of this invention is very high using only rugged mechanical components and a motor for the primary approach and only mechanical components, an angle sensor, and an external recorder for the alternate approach.

Although the descriptions above contain many specificities, these should not be construed as limiting the scope of the invention but as merely providing illustrations of some of the presently preferred embodiments of this invention. For example, if a recorder can be found of sufficient ruggedness to withstand automotive repair shop useage, and of sufficiently low cost, then the described alternate approach would become the primary approach. Such a recorder may be present in a shop with other electronic test equipment.

Thus the scope of the invention would be determined by the appended claims and their legal equivalents, rather than by the examples given.

We claim:

1. A method for testing, recording, and evaluating the damping characteristics of a vehicle suspension system comprising the steps of:
   a. Extending the suspension system by raising the vehicle body whereby a vehicle wheel hangs free;
   b. Releasing the vehicle to fall under the influence of gravity and unimpeded by other external forces;
   c. Measuring and recording the motion of the vehicle body with respect to the top of said wheel; and
   d. Comparing the record of said motion with a baseline record made when the vehicle was new or when it was performing as new;
   whereby said measuring and recording permits detection and evaluation of large and small deviations of suspension performance of the vehicle being tested as compared with the baseline performance of the vehicle suspension as recorded when the vehicle was new.

2. An apparatus for testing, recording, and comparing the damping characteristics of a vehicle suspension system comprising:
   a. a means to raise the vehicle body and to release said body to fall under the influence of gravity and unimpeded by other external forces;
   b. a wheel mounted means to measure and record the vehicle body motion with respect to the top of a wheel of the vehicle and provide a performance curve which is a visible record of said motion;
   c. a means to overlay a baseline curve of vehicle body motion with respect to the top of a wheel over the curve produced by said wheel mounted means in a manner highlighting the differences between the two curves;
   d. a family of baseline curves of vehicle body motion with respect to the top of a wheel, wherein said family of baseline curves was obtained using a substantially similar apparatus for testing vehicle suspension systems, each member of said family of baseline curves being for a single make and model of vehicle to be tested, whereby the performance curves of a particular vehicle suspension system being tested are compared with and evaluated against the baseline curves.

3. The apparatus of claim 2 wherein said means to raise and release said vehicle body comprises a scissors jack which is modified by replacement of the normal jack screw nut with a quick release mechanism, where, upon activation, said quick release mechanism permits the jack screw to slide freely thereby permitting the vehicle body to fall under the influence of gravity and unimpeded by other external forces.

4. The apparatus of claim 3 wherein said quick release mechanism comprises a threaded split nut, a threaded split nut retainer capable of enclosing said split nut, and means for opening the threaded split nut so that when the split nut retainer is withdrawn the threaded split nut is opened by the means for opening the threaded split nut.

5. The apparatus of claim 2 wherein said wheel mounted means to measure and record the vehicle body motion and provide a performance curve comprises
   a wheel mounted assembly including a base upon which is mounted a constant speed turntable upon which is retained paper upon which is recorded the vehicle body motion with respect to the top of the wheel, and
   a motion coupling arm one end of which is fastened to the vehicle body by a magnet or suction cup and driven by the substantially vertical motion of the vehicle body, the other end of said arm serving as a mounting for a marking means, said motion coupling arm being retained in its middle region by a pivot mounted upon said base of said wheel mounted assembly, where the length of said motion coupling arm permits effective engagement of the said marking means upon said paper
   whereby the vertical body motion is converted to angular motion, said angular motion being transferred to said other end of the arm which mounts the marking means, said marking means thereby producing a scaled image upon said paper, said image representing the motion of the vehicle body with respect to the top of the wheel, whereby said image upon said paper is a record of the vehicle body position with respect to the top of the wheel versus time.

6. The apparatus of claim 5 wherein the motion coupling arm forms a dog-leg configuration for vehicles in which the vehicle body is entirely above the vehicle wheels, said dog-leg configuration comprises a vertical rod and a horizontal rod, wherein said vertical rod contains said one end of the motion coupling arm fastened to the vehicle body, said magnet or suction cup being attached at the upper end of said vertical rod thereby permitting the vehicle body motion to be coupled to the motion coupling arm in an effective manner.

7. The apparatus of claim 5 wherein the motion coupling arm is fabricated of a semi-rigid material with a rectangular cross section with a long and a narrow dimension, where the long dimension of said rectangular cross section is in the direction parallel to the plane of the vehicle wheel providing rigidity for effective transmission of vertical vehicle body position information while the narrow dimension of said rectangular cross section of the motion coupling arm provides limited flexibility in a plane perpendicular to the plane of the wheel, thereby permitting effective adjustment of the tension on said marking means against the recording paper, said marking means comprising a standard wooden pencil which is self-threaded when forcibly screwed into a threaded hole of appropriate size in said arm wherein the screwing of the said standard wooden pencil causes the pencil to advance or retract thereby adjusting said tension.

8. The apparatus of claim 1 wherein said means to measure and record the vehicle body motion and provide a performance curve is a wheel mounted assembly comprising a base upon which is mounted an angle sensing device which is connected to one end of a motion coupling arm, the other end of which is fastened to the vehicle body by a magnet or a suction cup, said angle sensing device producing an electrical signal which is representative of the vehicle body position with respect to the top of the wheel, said electrical signal being recorded on a recorder which produces for evaluation a performance curve of vehicle body position with respect to the top of a wheel versus time for comparison with a baseline curve, said baseline curve obtained using a substantially similar means to measure and record vehicle body motion and provide a performance curve of a new vehicle of the same make and model or type.

9. The apparatus of claim 8 wherein said electrical signal is applied to computerized equipment for comparison with baseline data.

* * * * *